United States Patent [19]

Clark

[11] Patent Number: 5,001,587
[45] Date of Patent: Mar. 19, 1991

[54] PROTECTION CIRCUIT FOR RAILROAD SIGNALING HIGH VOLTAGE SURGE PROTECTION CIRCUIT

[75] Inventor: O. Melville Clark, Tempe, Ariz.

[73] Assignee: Square D Company, Palatine, Ill.

[21] Appl. No.: 356,445

[22] Filed: May 24, 1989

[51] Int. Cl.⁵ ............................................. H02H 3/24
[52] U.S. Cl. .................................. 361/117; 361/120; 361/126
[58] Field of Search ..................... 361/56, 58, 91, 111, 361/117, 118, 120, 126

[56] References Cited

U.S. PATENT DOCUMENTS

| | | | |
|---|---|---|---|
| 3,793,535 | 2/1974 | Chowdhuri | 361/118 X |
| 4,389,695 | 6/1983 | Carpenter, Jr. | 361/56 X |
| 4,539,617 | 9/1985 | Delaney et al. | 361/58 |
| 4,586,104 | 4/1986 | Standler | 361/91 |
| 4,677,518 | 6/1987 | Hershfield | 361/118 X |
| 4,689,713 | 8/1987 | Hourtane et al. | 361/118 |
| 4,698,722 | 10/1987 | Kron | 361/111 |
| 4,777,555 | 10/1988 | Esculpavit et al. | 361/111 |
| 4,802,055 | 1/1989 | Beckerman | 361/56 |

Primary Examiner—Derek S. Jennings
Attorney, Agent, or Firm—Cahill, Sutton & Thomas

[57] ABSTRACT

A surge suppressor suitable for protecting railroad switching systems from lightning directly striking a rail of a railroad track includes a pair of spark gap surge suppressors each coupled between a ground conductor and a corresponding rail. A spark gap equalizer is connected between the first and second conductors coupled to the rails, respectively. A first inductor is connected between the first conductor and a first output terminal, which is coupled to an input of the railroad switching system. A second inductor is connected between the second conductor and a second output, which is connected to another input of the railroad switching system. A first surge suppressor diode is connected between the first and second output conductors, and a second surge suppressor diode is connected in the opposite direction between the first and second output conductors. The surge suppressor provides a steady level of voltage clamping to the railroad signaling equipment despite increasing breakdown voltages of the air gap surge suppressors and the air gap equalizer device caused by suppressing voltage surges produced by a number of lightning strikes and the resulting melting pointed teeth in the air gap devices.

12 Claims, 2 Drawing Sheets

PROTECTION CIRCUIT FOR RAILROAD SIGNALING HIGH VOLTAGE SURGE PROTECTION CIRCUIT

BACKGROUND OF THE INVENTION

When lightning directly strikes a rail of a railroad track, very large surge currents and surge voltages are produced in the rail. Direct lightning strikes can deliver up to 200 kiloamperes of peak current. An average direct lightning strike produces peak currents of about 20 kiloamperes. Railroad signaling devices and/or other electronic equipment which are connected to the conductive rails are very likely to be seriously damaged by such surges unless adequate surge protection equipment is inserted in the electrical connections between the rails and the railroad signaling devices or the like.

So called "air gap" surge protection devices commonly are used as surge suppressors for this purpose. Conventional air gap suppressors have pointed conductive teeth that are spaced apart by a precisely determined distance. Then, if the voltage difference between the railroad rails exceeds the threshold voltage of the air gap device, the gap between the pointed teeth becomes ionized at about 1200 to 1500 volts and arcs and then produces a very low impedance short circuit between the teeth, and the surge current associated with the surge voltage is discharged through the pointed teeth and across the ionized air gap instead of into the railroad signaling equipment and thereby causing damage. A problem with such prior air gap surge suppressors is that the high surge currents tend to melt the pointed teeth, thereby both increasing the air gap spacing between the points of the teeth and rounding the points of the teeth. These effects substantially increase the threshold of the air gap suppressor, thereby increasing the amount of surge voltage that must appear between the rails, and hence across the air gap device, before the railroad signaling circuitry will be effectively protected by ionization and short circuiting of the air gap device. Such increased, unshunted surge voltage increases the likelihood and severity of damage to the railroad signaling equipment. For example, a typical prior air gap surge suppressor may require replacement after suppressing surge voltages from only about 5 to 10 average lightning strikes Furthermore, the build-up of 1200–1500 volts between the rails may damage the signaling equipment even before a conventional air gap surge suppressor begins to protect the equipment.

Accordingly, it is an object of the invention to provide a surge suppressor that provides adequate surge suppression between a rail struck by lightning and railroad signaling equipment coupled to the rail, even though the threshold of an air gap device in the surge suppressor has increased due to melting and rounding of its pointed teeth by surges produced by prior lightning strikes.

It is another object of the invention to provide a surge suppressor that needs replacement less often than prior surge suppressors.

It is another object of the invention to provide a surge suppressor that provides a relatively constant voltage clamping level despite increases of threshold of an air gap device therein due to cumulative effects of prior lightning strikes.

Briefly described and in accordance with one embodiment thereof, the invention provides a voltage surge suppressor including a first air gap suppressor connected between a first conductor and a ground conductor, a second air gap suppressor connected between a second conductor and the ground conductor, a first air gap equalizer connected between the first and second conductors, a first inductor coupled between the first conductor and a third conductor, a second inductor coupled between the second conductor and a fourth conductor, a first surge suppressor diode having its anode connected to the third conductor and its cathode connected to the fourth conductor, a second surge suppressor diode having its cathode connected to the third conductor and its anode connected to the fourth conductor, the third and fourth conductors being adapted to supply power to a railroad signaling circuit.

In one embodiment, a third inductor is coupled between the third conductor and the first inductor, a fourth inductor is coupled between the fourth conductor and the second inductor. A second air gap equalizer is connected between the junction joining the first and third inductors and the junction joining the second and fourth inductors.

DETAILED DESCRIPTION OF THE PREFERRED EMBODIMENTS

Figure 1:
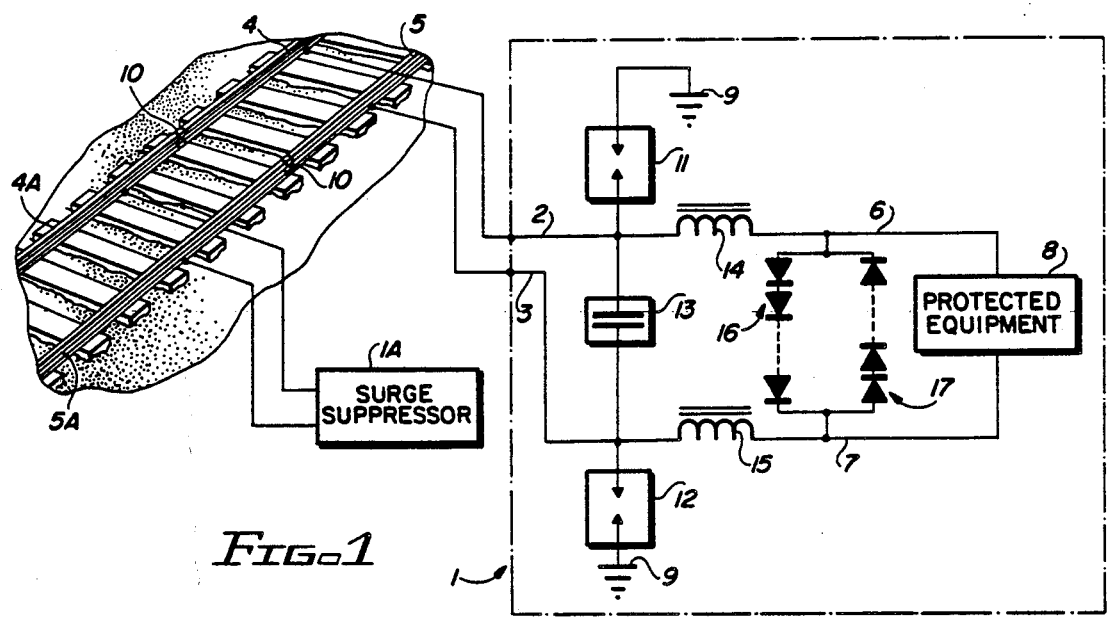
FIG. 1 is a schematic diagram of a surge suppressor connected between a pair of railroad tracks and a railroad signaling device.

Referring to FIG. 1, surge suppressor 1 includes input terminals 2 and 3, which are connected by wires (typically 8-10 feet long) to electrically isolated rail segments 4 and 5, respectively, of a railroad track. (Numeral 10 designates electrical insulators between rail segments 4 and 4A and between rail segments 5 and 5A. A surge suppressor 1A identical to surge suppressor 1 is connected between rail segments 4A and 5A.) An open air gap surge suppressor 11 is connected between terminal 2 and a ground conductor 9. Air gap surge suppressor 12 is connected between terminal 3 and ground conductor 9. Air gap surge suppressors 11 and 12 can be model 002485-36X CLEARVIEW lightning arrestors manufactured by Safetran Systems Corporation. An open air gap equalizer 13 is connected between terminals 2 and 3. Air gap equalizer 13 can be a model 022700-1X EQUALIZER, manufactured by Safetran Systems Corporation. It has an initial breakdown or threshold voltage of about 250 volts. An iron core inductor 14 is connected between conductors 2 and 6. Similarly, iron core inductor 15 is connected between conductors 3 and 7. Inductors 14 and 15 each can have an inductance of 100 microhenrys.

Depending on the relative conditions of the pointed teeth of spark gap suppressors 11 and 12 (some or all of which may be rounded or burned away as a result of suppressing a number of lightning strikes), air gap suppressors 11 and 12 may have significantly different breakdown voltages. Spark gap suppressors 11 and 12 can have an initial breakdown voltage of approximately 1200 volts. In the course of being subjected to roughly 5 to 20 lightning strikes, the breakdown voltage can increase to approximately 5000 volts.

Surge suppressor diode stack 16 has its anode connected to conductor 6 and its cathode connected to conductor 7. Surge suppressor diode stack 17 has its anode connected to conductor 7 and its cathode connected to conductor 6. The diodes in stacks 16 and 17 can be similar or identical to those in the assignee's 5KP TRANSORB suppressor series. Conductors 6 and 7 are applied to the input terminals of a railroad signaling system 8 or other electronic equipment that needs to be protected from damage due to lightning strikes on rails 4 and 5.

If a typical lightning strike hits rail 4, a large surge voltage appears between conductor 2 and ground conductor 9, and also between conductors 2 and 3. If a "severe" lightning strike hits rail 4, even larger surge voltages appear between conductor 2 and ground conductor 9, and furthermore large sustained currents also may flow between conductor 2 and ground conductor 9.

Figure 3:
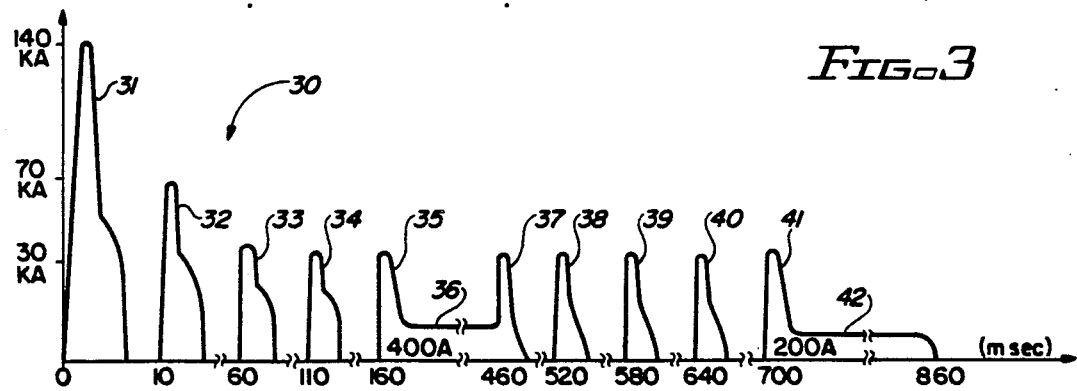
FIG. 3 is a waveform of a severe lightning flash including multiple strokes and sustained high current levels.

FIG. 3 illustrates a model of a "severe lightning stroke" taken from *Technical Report One*, August 1972, "A Ground-Lightning Environment for Engineering Usage" by N. Cianos and E.T. Pierce, published by Stanford Research Institute, SRI Project 1834. FIG. 3 shows that a severe lightning stroke includes an initial current surge 31 of 140 kiloamperes, followed by current surges 32, 33, and 34 of lower amplitudes between 30 and 70 kiloamperes. Later, the same lightning flash 30 produces a 30 kiloampere current surge 35 and another 30 kiloampere current surge 37, but maintains a continuing 400 ampere current 36 between current surges 35 and 37. The same lightning flash 30 may then include a number of additional current surges 38-40 followed by a continuous 200 ampere current 42. The high current surges are of short duration, less than 40 milliseconds, but the sustained currents 36 and 42 are of very long duration, often several hundred milliseconds. The sustained current levels such as 36 and 42 can produce a great deal of stress on the surge suppressor components.

In response to the current surges, air gap suppressor 11 breaks down or ionizes at approximately 1200–1500 volts and then, in effect, becomes a short circuit. Inductors 14 and 15 reduce the peak voltages at high currents and also reduce the peak currents before they reach the suppressor diode stacks 16 and 17. The dynamic impedance of inductor 14 causes a large voltage to be developed across it and consequently across air gap equalizer 13, causing it to break down. Equalizer 13 breaks down at approximately 250 volts, and has an arc conduction voltage of approximately 30 volts. Air gap suppressors 11 and 12 also have an arc conduction voltage of approximately 30 volts.

The current surges pass through inductor 14, the voltage between conductors 6 and 7 increases, and diode stack 16 becomes forward biased, thus clamping the voltage on conductor 6 and preventing it from exceeding about 10 volts relative to conductor 7.

In some cases, a lightning strike directly hitting track 4 may also strike track 5 or arc over to track 5 and cause large surge currents in it also.

Figure 4:
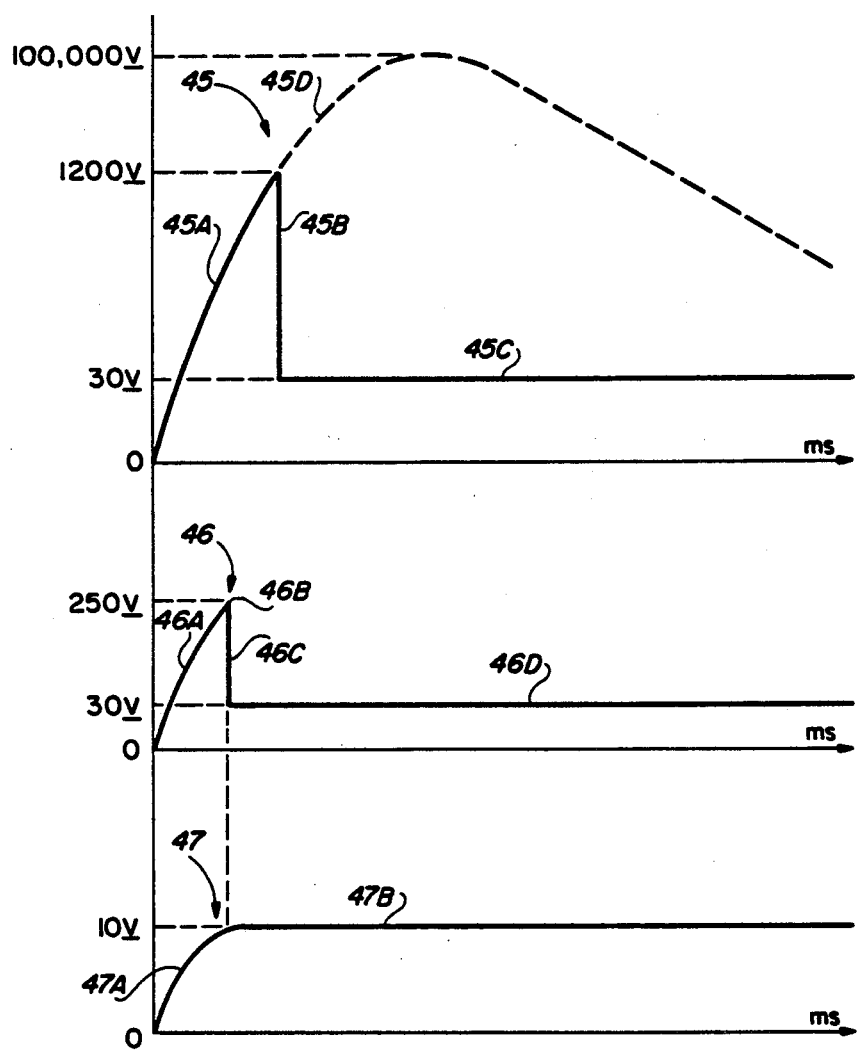
FIG. 4 is a diagram illustrating waveforms produced in the circuit of FIG. 1 as a result of a lightning strike.

FIG. 4 shows the typical voltages between conductor 2 and ground conductor 9, between conductors 2 and 3, and between conductors 6 and 7 in response to a typical current surge of a lightning flash. Waveform 45 designates the voltage on conductor 2, which includes a rapidly rising portion 45A that increases to the breakdown voltage of air gap suppressor 11 (1200 volts). Air gap suppressor 11 then ionizes, lowering the voltage on conductor 2 to approximately 30 volts, as indicated by section 45C.

Waveform 46 indicates the voltage difference between conductors 2 and 3. The voltages between conductors 2 and 3 may rapidly build up to different levels, due to the different levels of current surges being produced in conductors 2 and 3 by the lightning stroke and due to the different voltages being induce across inductors 14 and 15. Nevertheless, there will usually be a large difference between the voltages on conductors 2 and 3; the buildup of this voltage difference is designated by section 46A of waveform 46. Air gap equalizer 13 ionizes at approximately 250 volts, as indicated by peak 46B, and limits the build-up of current through inductor 14 if the surge current through conductor 2 exceeds that through conductor 3. As the voltages induced across inductors 13 and 15 stabilize, air gap equalizer 13 lowers the voltage difference between conductors 2 and 3 to approximately 30 volts, as indicated by segments 46C and 46D of waveform 46 in FIG. 4.

Waveform 47 in FIG. 4 shows the build-up of voltage between conductors 6 and 7 in response to the waveform 46. Assuming that the current surge into conductor 2 is larger than into conductor 3, the diodes in diode stack 16 become forward biased, and after building up to about 10 volts during section 47A, the diodes in stack 16 clamp the voltage difference between conductors 6 and 7 to approximately 10 volts (depending on how many diodes there are in stack 16).

As a result of the above described operation, the surge suppressor circuit 1 of FIG. 1 is very effective in preventing overvoltage differences of more than about 10 volts between conductors 6 and 7 from being applied to the protected equipment 8, even for the most severe lightning flashes such as the one shown in FIG. 3, essentially independently of the breakdown voltages and arc conduction voltages of the surge suppressors 11 and 12 and equalizer 13.

Figure 2:
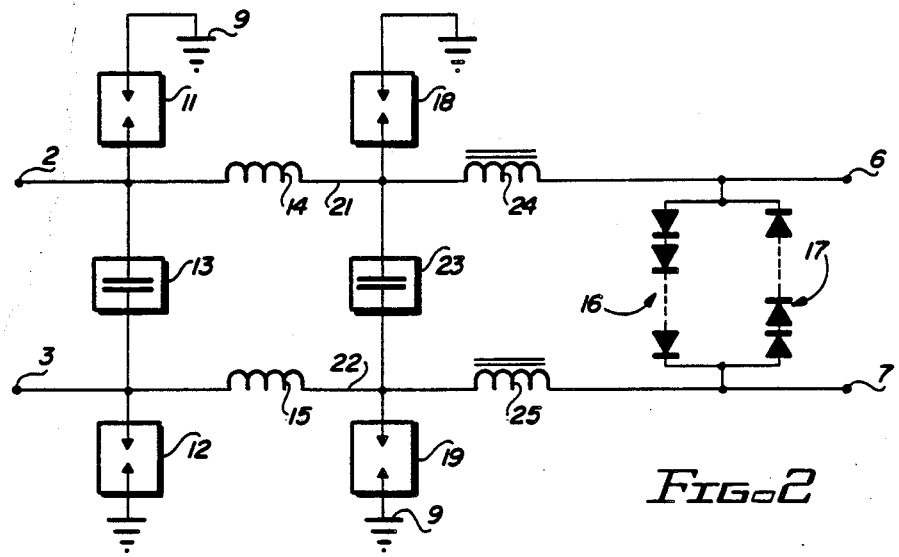
FIG. 2 is a circuit schematic diagram of an alternate embodiment of the surge suppressor of FIG. 1.

Referring next to FIG. 2, the surge suppressor shown is similar to surge suppressor 1 of FIG. 1, except that a second stage including air gap suppressors 18 and 19, a second spark gap equalizer 23, and iron core inductors 24 and 25, has been inserted between inductors 14 and 15 and conductors 6 and 7. More specifically, inductor 24 is connected by conductor 21 to the right hand terminal of inductor 14. The opposite terminal of inductor 24 is connected to conductor 6, to which surge suppressor diode stacks 16 and 17 are connected, as in FIG. 1. Similarly, inductor 25 is connected by conductor 22 to one terminal of inductor 15. The other terminal of inductor 25 is connected by conductor 7 to diode stacks 16 and 17. Air gap equalizer 23 is connected between conductors 21 and 22. Air gap suppressor 18 is connected between ground conductor 9 and conductor 21, and air gap suppressor 19 is connected between ground conductor 9 and conductor 22. Air gap suppressors 18 and 19 are identical to air gap suppressors 11 and 12. The inductance of inductors 24 and 25 can be 100 microhenrys.

The second stage of protection afforded by the circuit of FIG. 2 over than of FIG. 1 can provide an even higher degree of protection of equipment 8 from lightning strokes.

Figure 5:
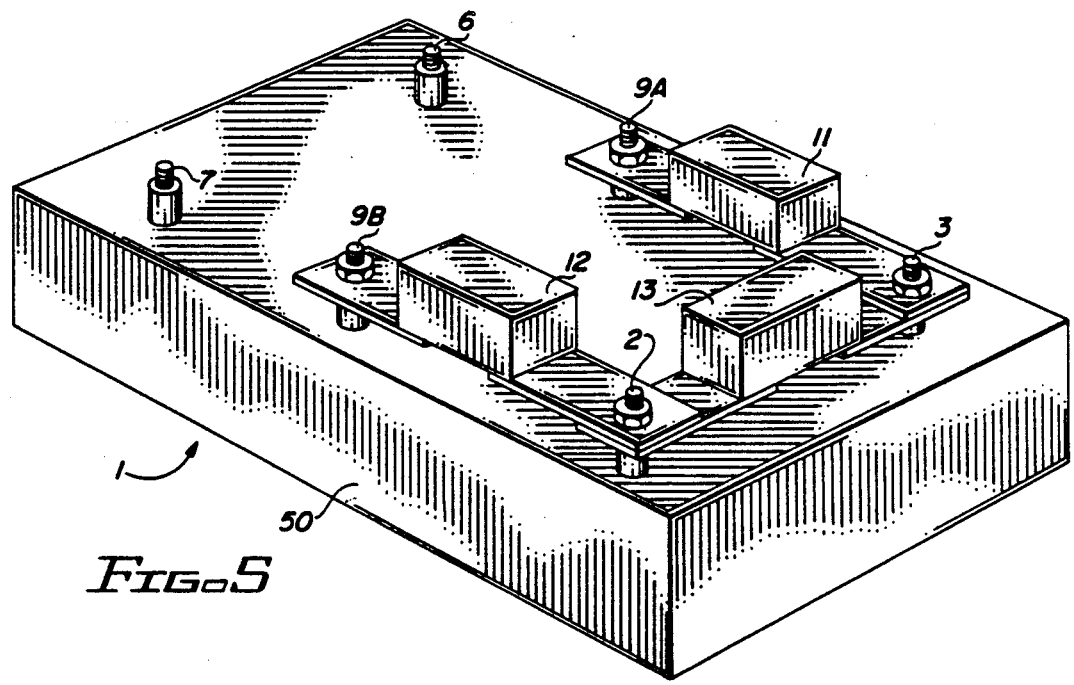
FIG. 5 a perspective view of a housing including/supporting the surge suppressor of FIG. 1.

FIG. 5 shows a practical embodiment of the surge suppressor 1 of FIG. 1, wherein the inductors 14 and 15 are encapsulated in a plastic housing 50 measuring approximately 3 inches by 6 inches by 2 inches. Conductive threaded studs 2 and 3 are connected to the rails 4 and 5. Threaded studs 9 are connected to suitable ground cables (not shown). Air gap suppressor 11 is connected between threaded studs 3 and 9A, and air gap surge suppressor 12 is connected between threaded studs 2 and 9B. Air gap equalizer 13 is connected between threaded studs 2 and 3. The equipment to be protected is connected between threaded studs 6 and 7, which correspond to terminals 6 and 7 in FIG. 1. The air gap surge suppressors 11 and 12 and air gap equalizer 13 can be easily inspected to determine if they are still suitable for further use, and if not, can be easily removed by simply removing the nuts on the appropriate posts 2, 3, 9A, 9B and replacing the defective elements.

While the invention has been described with reference to several embodiments thereof, those skilled in the art will be able to make various modifications to the described embodiments without departing from the true spirit and scope of the invention.

What is claimed is:

1. A surge suppressor for protecting equipment electrically coupled to rails of a railroad track, comprising in combination:
   (a) a first air gap surge suppressor having a first terminal connected to a first conductor that is coupled to a first rail, and a second terminal coupled to a ground conductor;
   (b) a second air gap surge suppressor having a first terminal connected to a second conductor that is coupled to a second rail, and a second terminal connected to the ground conductor;
   (c) a first air gap equalizer connected between the first and second conductors;
   (d) a first inductor coupled between the first conductor and a third conductor;
   (e) a second inductor coupled between the second conductor and a fourth conductor;
   (f) a first surge suppressor diode having an anode coupled to the third conductor and a cathode coupled to the fourth conductor;
   (g) a second surge suppressor diode having a cathode coupled to the third conductor and an anode coupled to the fourth conductor, the third and fourth conductors being connected to first and second input conductors of the protected equipment, respectively.

2. The surge suppressor of claim 1 wherein the first and second air gap surge suppressors have initial threshold voltages of approximately 1200 to 1500 volts and the air gap equalizer has a threshold voltage of approximately 250 volts.

3. The surge suppressor of claim 2 wherein the first and second inductors are iron core inductors, and each has an inductance of approximately 100 microhenrys.

4. The surge suppressor of claim 1 further including a third inductor coupled between the first inductor and the third conductor, a fourth inductor coupled between the second inductor and the fourth conductor, and a second air gap equalizer connected between a junction between the first and third inductors and a junction between the first and fourth inductors.

5. The surge suppressor of claim 4 wherein the second air gap equalizer has a threshold voltage of approximately 250 volts and the third and fourth inductors are iron core inductors each having an inductance of approximately 100 microhenrys.

6. The surge suppressor of claim 5 including a third air gap surge suppressor connected between the ground conductor and the junction between the first and third inductors, and a fourth air gap suppressor connected between the ground conductor and the junction between the second and fourth inductors.

7. The surge suppressor of claim 6 wherein the third and fourth air gap surge suppressors have initial threshold voltages of approximately 1200 to 1500 volts.

8. The surge suppressor of claim 1 wherein the first surge suppressor diode is included in a first stack of like series-connected surge suppressor diodes, and the second surge suppressor diode is included in a second stack of like series-connected surge suppressor diodes.

9. The surge suppressor of claim 1 wherein the first and second air gap suppressors are open air gap surge suppressors.

10. The surge suppressor of claim 1 including a housing composed of electrically insulative material, the first and second inductors being encapsulated in the housing, the first and second conductors being connected to first and second conductive threaded studs, respectively, extending from the housing, the third and fourth conductors being connected to third and fourth conductive threaded studs, respectively, extending from the housing, the ground conductor being connected to fifth and sixth conductive threaded studs extending from the housing, the first air gap surge suppressor being secured by nuts between the first and fifth studs, the second air gap insulator being secured by threaded nuts between the second and sixth studs, the air gap equalizer being secured by nuts between the first and second studs, whereby the condition of the first and second air gap surge suppressors and the air gap equalizer can be determined by visual inspection, and the first and second air gap surge suppressors and/or the air gap equalizer can be easily replaced.

11. A method of protecting equipment coupled to first and second rails of a railroad track, comprising the steps of:
   (a) coupling a first voltage surge produced on a first rail by a lightning strike to a first conductor, and coupling a corresponding second voltage surge on a second rail of the railroad track to a second conductor;
   (b) causing ionization in a first air gap surge suppressor connected between the first conductor and a ground conductor in response to the first voltage surge;
   (c) causing ionization in an air gap equalizer connected between the first conductor and a second conductor coupled to the second rail in response to the first and second voltage surges, thereby reducing the voltage between the first and second conductors to an arc conduction voltage of the air gap equalizer;
   (d) reducing a differential voltage between the first and second conductors by means of first and second inductors, the first inductor having a first terminal connected to the first conductor and a second terminal connected to a third conductor, the second inductor having a first terminal connected to the second conductor and a second terminal connected to a fourth conductor;

(e) forward biasing a first surge suppressor diode in response to the differential voltage, the first surge suppressor diode having an anode coupled to the third conductor and a cathode coupled to the fourth conductor, whereby the first air gap suppressor and the air gap equalizer dissipate most of the energy of the first voltage surge, the first and second inductors reduce the differential voltage between the terminals of the air gap equalizer, and the first surge suppressor diode clamps the voltage applied by the third and fourth conductors to the signaling equipment substantially independently of increases in breakdown voltages of the first and second air gap suppressors and the air gap equalizer.

12. A surge suppressor for protecting equipment electrically coupled to rails of a railroad track, comprising in combination:

(a) a first air gap surge suppressor having a first terminal connected to a first conductor that is coupled to a first rail, and a second terminal coupled to a ground conductor;

(b) a second air gap surge suppressor having a first terminal connected to a second conductor that is coupled to a second rail, and a second terminal connected to the ground conductor;

(c) an air gap equalizer connected between the first and second conductors;

(d) a first inductor coupled between the first conductor and a third conductor;

(e) a second inductor coupled between the second conductor and a fourth conductor;

(f) surge suppressor means coupled between the third conductor and the fourth conductor, the third and fourth conductors being connected to first and second input conductors of the protected equipment, respectively.

* * * * *